Jan. 13, 1959 W. C. ESPENLAUB ET AL 2,868,872

MATRIXING APPARATUS FOR COLOR-SIGNAL TRANSLATING SYSTEM

Filed Oct. 6, 1953 3 Sheets-Sheet 1

Jan. 13, 1959 W. C. ESPENLAUB ET AL 2,868,872

MATRIXING APPARATUS FOR COLOR-SIGNAL TRANSLATING SYSTEM

Filed Oct. 6, 1953 3 Sheets-Sheet 3

United States Patent Office 2,868,872

Patented Jan. 13, 1959

2,868,872

MATRIXING APPARATUS FOR COLOR-SIGNAL TRANSLATING SYSTEM

Walter C. Espenlaub, Great Neck, and Bernard D. Loughlin, Lynbrook, N. Y., assignors to Hazeltine Research, Inc., Chicago, Ill., a corporation of Illinois Application October 6, 1953, Serial No. 384,488

4 Claims. (Cl. 178—5.4)

GENERAL

The present invention is directed to matrixing apparatus for color-signal translating systems and, particularly, to such apparatus in color-television receivers for developing from a pair of signals individually representative of different components of the color of a televised image, signals representative of other different components of the color of the aforesaid image.

In a form of color-television system more completely described in an article in "Electronics" for February 1952 entitled "Principles of NTSC Compatible Color Television" at pages 88–95, inclusive, information representative of a scene in color being televised is utilized to develop at the transmitter two substantially simultaneous signals, one of which is primarily representative of the luminance and the other representative of the chromaticity of the image. To develop the latter signals, the scene being televised is viewed by one or more television cameras to develop color signals individually representative of such primary colors as green, red, and blue of the scene and these signals are combined in a manner more fully described in the aforesaid article to develop a signal which primarily represents all of the luminance or brightness information relating to the televised scene. Additionally, these color signals or signals representative thereof are individually applied as modulation signals to a subcarrier wave signal developed at the transmitter, effectively to modulate the latter signal at predetermined phase points thereof to develop the signal representative of the chromaticity of the scene being televised. Conventionally, the modulated subcarrier wave signal or chromaticity signal has a predetermined frequency less than the highest video frequency, for example, a frequency of approximately 3.6 megacycles, and has amplitude and phase characteristics related to the saturation and hue of the color being transmitted. In the specific form of such system, as described in the aforementioned article, the three color signals are initially modified to become at least two color-difference signals, in other words, to become signals such that when they are individually added in a receiver to the luminance signal, color signals will be developed. Such color-difference signals are usually, but not necessarily, limited in band width to less than 2 megacycles and different ones thereof may have different band widths. The color-difference signals are utilized to modulate the subcarrier wave signal at quadrature-phase points thereof. In one embodiment of such system, which will be considered more fully hereinafter, the phase axes of such quadrature signals do not coincide with any of the three phase axes of the signals representative of the primary colors in the system as such signals inherently occur as modulation components of the subcarrier wave signal. It has become conventional to designate the quadrature signals as I and Q signals and the color-difference signals as G–Y, R–Y, and B–Y signals, the latter three signals representing, respectively, the green, red, and blue colors of the image. It has been found that the eye has less acuity for details in the colors represented by the components on the Q axis while having greater acuity for details in the colors represented by the components on the I axis. Therefore, the quadrature signal I is usually proportioned to have a band width of approximately 1.3 megacycles, while the signal Q has a narrower band width of approximately 0.6 megacycle. After the modulated subcarrier wave signal including the I and Q signals as modulation components has been developed, the latter wave signal is combined with the luminance signal in an interlaced manner to form in a pass band common to both signals a resultant composite video-frequency signal which is transmitted in a conventional manner. Because of the 3.6 megacycle frequency of the subcarrier wave signal and a video-frequency range of only 0–4.2 megacycles, the Q component can be translated as a double side-band modulation component but at least a higher frequency portion of the I component is translated only as a single side-band component.

A receiver in such a television system intercepts the transmitted signal and initially derives therefrom the chromaticity signal and the luminance or brightness signal. The quadrature-modulation components of the chromaticity signal, specifically, the I and Q signals, are derived by a detection means which is designed to operate in synchronism and in proper phase relation with the subcarrier wave-signal modulating means at the transmitter. Because of the single side-band translation of the higher frequency I components, quadrature cross talk of these components may occur in the channel for translating the derived Q components. To minimize this effect the latter channel has a pass band wide enough for translating substantially only the double side-band components, that is, a pass band of substantially .6 megacycle. In view of the lack of coincidence between the quadrature-phase axes of the I and Q signals and the phase axes of the three color-difference signals as modulation signals of the subcarrier wave signal, the detection means further comprises a signal-combining circuit for combining components of the derived wider band width I and narrower band width Q signals to develop the color-difference signals G–Y, R–Y, and B–Y. The color-difference signals, desirably including primarily chromaticity information, and the derived luminance signal are combined to develop color signals individually representative of the green, red, and blue of the televised image. After being effectively combined, these color signals are utilized in an image-reproducing apparatus to cause this apparatus to develop a color reproduction of the televised scene.

In present detection means in color-television receivers for developing color-difference signals for utilization in such receivers, detection circuits are included for deriving the I and Q signals from the modulated subcarrier wave signal. Since the I and Q signals do not lend themselves directly to utilization by available image-reproducing apparatus, a matrixing apparatus is utilized to combine components of the I and Q signals in different proportions and senses to develop color-difference signals which may be utilized by such image-reproducing apparatus. Such detection circuits and particularly the matrixing apparatus therein tends to become complex and expensive because of the multiplicity of circuits included to perform the many varied operations, especially if such operations are performed as at present in a step-by-step manner. It is, therefore, desirable to reduce the complexity and expensiveness of such matrixing apparatus and, therefore, of such detection circuits by effectively performing the desired matrixing operations while the signals representative of the different color components are still modulation components of subcarrier wave signals.

It is, therefore, an object of the present invention to provide a new and improved matrixing apparatus for a color-signal translating system which does not have the disadvantages and limitations of prior such apparatus.

It is also an object of the invention to provide for use in a color-signal translating system a new and improved matrixing apparatus which includes a small number of circuit elements to accomplish its purpose.

It is a further object of the invention to provide a new and improved matrixing apparatus for a color-signal translating system in which the circuit elements thereof perform multiple functions.

In accordance with the present invention there is provided in a color-signal translating system for translating one subcarrier wave signal modulated at different phase points by individual ones of a pair of components which are individually representative of different colors of a televised image and which have different maximum band widths the higher frequency portion of the wider band components of the pair being translated with only a single side band for at least a portion thereof, a matrixing apparatus for developing from the one wave signal another modulated subcarrier wave signal having another modulation component composed of predetermined magnitudes of the pair of components. The matrixing apparatus comprises first and second networks coupled for developing said other wave signal. The first of the networks is responsive to the one wave signal and has a pass band which is approximately equal to the band width of the modulation components representative of the wider band components and which includes the mean frequency of the one wave signal. The first network has predetermined amplitude-translation and phase-translation characteristics for developing therein a first signal modulated at a predetermined phase by the aforesaid wider band components. The second network is responsive to the one wave signal and has a pass band which is narrower than the first-mentioned pass band and which is approximately equal to the band width of the modulation components representative of the narrower band components of the aforesaid pair of components and which includes the mean frequency of the one wave signal. The second network has an amplitude-translating characteristic proportioned with relation to that of the first network and has a phase-translation characteristic different from that of the first network for developing in the second network a second signal modulated by the aforesaid narrower band components at a phase point corresponding substantially to that of the aforementioned predetermined phase. The aforesaid coupling of the first and second networks effects a combination of the first and second signals to develop the aforesaid other wave signal having said other modulation component at said predetermined phase.

For a better understanding of the present invention, together with other and further objects thereof, reference is had to the following description taken in connection with the accompanying drawings, and its scope will be pointed out in the appended claims.

Referring to the drawings:

Fig. 1 is a circuit diagram, partially schematic, of a color-television receiver having a color-signal translating system including a matrixing apparatus in accordance with the present invention;

Figs. 2*a*, 2*b*, and 2*c* are graphs utilized in explaining the operation of the matrixing apparatus of Fig. 1;

Figure 1:
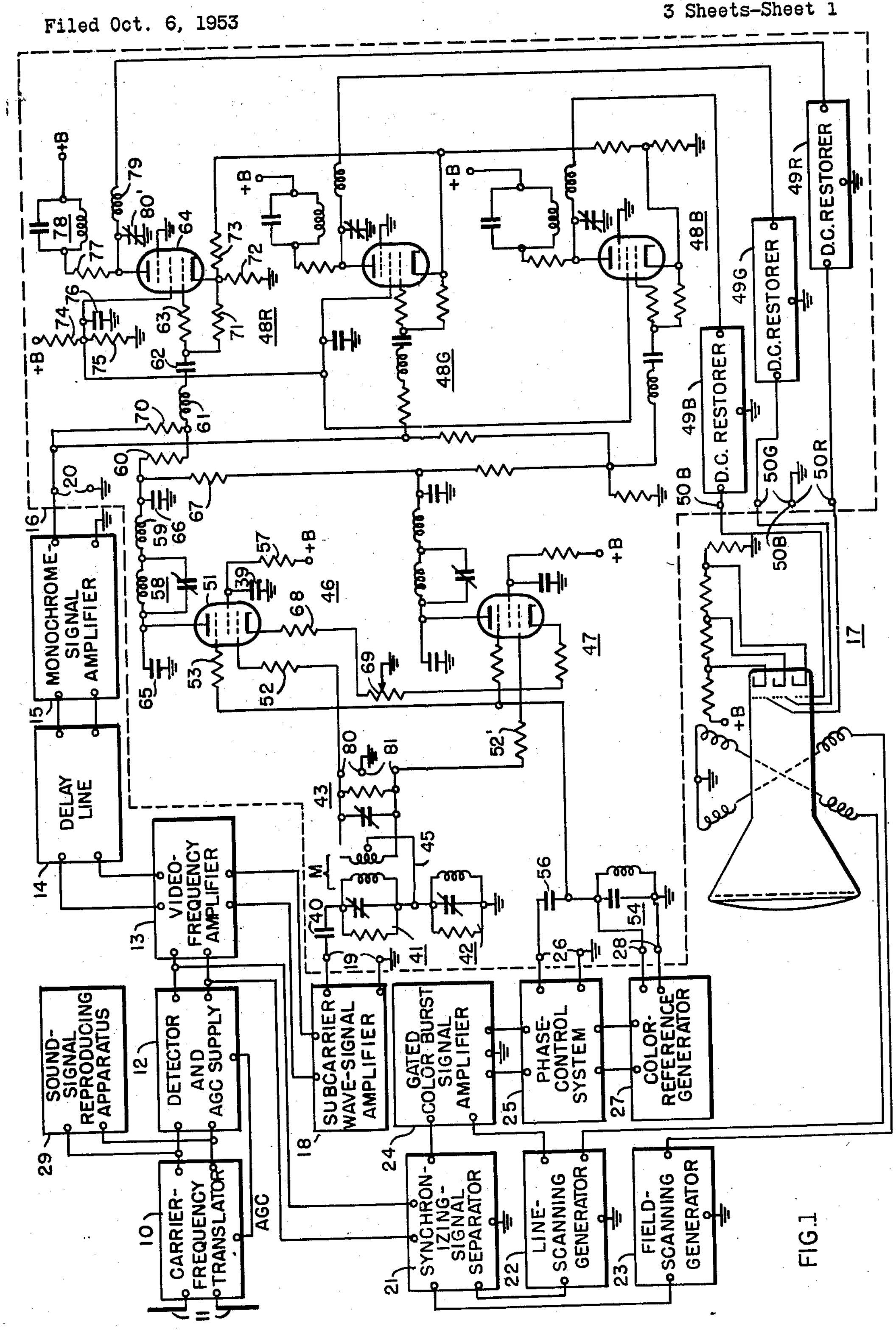

*General description of receiver of Fig. 1*

Referring now to Fig. 1 of the drawings, there is represented a color-television receiver of the superheterodyne type such as may be used in a color-television system of the type previously discussed herein and in the aforesaid "Electronics" article. It is preferable, though not essential, that properly developed luminance and chromaticity signals, which will be considered more fully hereinafter, are utilized in such a television system. The receiver includes a carrier-frequency translator 10 having an input circuit coupled to an antenna system 11. It will be understood that the unit 10 may include in a conventional manner one or more stages of wave-signal amplification, an oscillator-modulator, and one or more stages of intermediate-frequency amplification if such are desired. Coupled to the output circuit of the unit 10 in cascade, in the order named, are a detector and automatic-gain-control (AGC) supply 12, a video-frequency amplifier 13, a delay line 14, a monochrome-signal amplifier 15, a matrixing apparatus 16 in accordance with the present invention having input terminals 20, 20 and output terminals 50B, 50G, and 50R, and which will be described more fully hereinafter, and an image-reproducing device 17.

The amplifiers 13 and 15 are conventional wide-band units for amplifying signals having a maximum band width of approximately 0–4.2 megacycles. For some purposes, the band width of the amplifier 15 may be limited to an upper frequency of approximately 3 megacycles. The delay line 14 may be of conventional construction for delaying the translation of the signals applied thereto so that the time of travel of such signals, when they are applied to circuits in the apparatus 16, is equal to the time of travel of chromaticity signals from the output circuit of the amplifier 13 and translated through other channels for application to such circuits in the apparatus 16. The image-reproducing device 17 is conventional and may, for example, comprise a single cathode-ray tube having a plurality of cathodes and a plurality of control electrodes, different pairs of the cathode and control-electrode circuits being individually responsive to different color signals as will be explained more fully hereinafter and including an arrangement for directing the beams emitted from the cathodes individually onto different phosphors for developing different primary colors. Such a tube is more fully described in an article entitled "General Description of Receivers for the Dot-Sequential Color Television System Which Employ Direct-View Tri-Color Kinescopes" in the RCA Review for June 1950, at pages 228–232, inclusive. It should be understood that other suitable types of color-television image-reproducing devices may be employed.

An output circuit of the video-frequency amplifier 13 is also coupled through a modulated subcarrier wave-signal amplifier 18, which has a pass band of the order of 2.3–4.2 megacycles, through a pair of input terminals 19—19 to a pair of resonant circuits in the matrixing apparatus 16, which circuits will be described more fully hereinafter. An output circuit of the detector 12 is also coupled through a synchronizing-signal separator 21 to a line-scanning generator 22 and a field-scanning generator 23, output circuits of the latter units being coupled, respectively, to line-deflection and field-deflection windings of the image-reproducing device 17. Output circuits of the synchronizing-signal separator 21 and the line-scanning generator 22 are coupled through a gated color burst signal amplifier 24 to a phase-control system 25. An input circuit of the system 25 is also coupled through a pair of terminals 26, 26 to a tuned circuit in the matrixing apparatus 16 in a manner to be described more fully hereinafter, while the output circuit of the system 25 is coupled to a reference-signal generator 27 which has the output circuit thereof coupled through a pair of terminals 28, 28 to the last-mentioned tuned circuit in the unit 16. The generator 27 develops a sine-wave reference signal preferably having the frequency of the aforementioned subcarrier wave signal, that is, a frequency of approximately 3.6 megacycles and having a predetermined phase with respect to such subcarrier wave signal.

The AGC supply of the unit 12 is connected through the conductor identified as AGC to input terminals of one or more of the stages in the unit 10 to control the gains of such stages for maintaining the signal input to the detector 12 within a relatively narrow range for a wide range of received signal intensities. A sound-signal reproducing unit 29 is also coupled to an output circuit of the unit 10 and may include stages of intermediate-frequency amplification, a sound-signal detector, stages of audio-frequency amplification, and a sound-reproducing device.

It will be understood that the various units thus far described, with the exception of those in the matrixing apparatus 16, may be of any conventional construction and design, the details of such units and circuit elements being well known in the art and requiring no further description.

*General operation of receiver of Fig. 1*

Considering briefly now the operation of the receiver of Fig. 1 as a whole, a desired composite television signal preferably of the constant-luminance type is intercepted by the antenna system 11, is selected, amplified, converted to an intermediate frequency, and futher amplified in the unit 10, and the video-frequency modulation components thereof are derived in the detector 12 and amplified by the unit 13. These video-frequency modulation components comprise synchronizing components, the aforementioned modulated subcarrier wave signal or chromaticity signal, and a luminance or brightness signal. The luminance or brightness signal is translated through the delay line 14, is further amplified in the unit 15, and applied through the pair of terminals 20, 20 to circuits in the matrixing apparatus 16 in a manner to be described more fully hereinafter. The modulated subcarrier wave signal or chromaticity signal is amplified in the unit 18 and applied through the pair of input terminals 19, 19 to a pair of resonant circuits in the unit 16 in a manner to be described more fully hereinafter. The synchronizing components including line-frequency and field-frequency synchronizing signals as well as a color burst signal for synchronizing the operation of the detector for deriving the color signals in the unit 16 are separated from the video-frequency components and the line-frequency and the field-frequency components are separated from each other in the synchronizing-signal separator 21. The line-frequency and field-frequency synchronizing components are applied, respectively, to the units 22 and 23 to synchronize the operation of these generators with the operation of related units at the transmitter. These generators supply signals of saw-tooth wave form which are properly synchronized with respect to the transmitted signal and are applied to the line-deflection and field-deflection windings in the image-reproducing device 17 to effect a rectilinear scanning of the image screen in the device 17. The color burst signal, which is substantially a few cycles of an unmodulated portion of the subcarrier wave signal having a desired reference phase, is applied to the phase-control system 25 through the gated amplifier 24 during the line-blanking period and, in the well-known manner is employed by unit 25 to control the frequency and phasing of the signal developed in the signal generator 27. The amplifier 24 is rendered conductive during the line-blanking period by a control signal applied thereto from the output circuit of the generator 22. The signal developed in the generator 27 is applied through the pair of terminals 28, 28 to circuits in the matrixing apparatus 16 and, with other applied signals, is employed to effect derivation in the unit 16 of color-difference signals R–Y, G–Y, and B–Y representative, respectively, of the colors red, green, and blue. This derivation will be explained more fully hereinafter. As will also be described at such time, such color-difference signals combine with the luminance signal Y in the apparatus 16 supplied to terminals 20, 20 to develop color signals R, G, and B representative, respectively, of the red, green, and blue of the derived image. The signals R, G, and B are applied to different ones of the control-electrode circuits of the image-reproducing device 17 by way of the terminals 50B, 50G, and 50R individually to control the intensity of the different beams in the device 17. This intensity modulation of the cathode beams and the geometry of portions of the device 17 result in an excitation of different color phosphors on the image screen of the device 17 which causes a color image to be reproduced on that screen.

The automatic-gain-control or (AGC) signal developed in the unit 12 is effective to control the amplification of one or more of the stages in the unit 10, thereby to maintain the signal input to the detector 12 and to the sound-signal reproducing apparatus 29 within a relatively narrow range for a wide range of received signal intensities. The sound-signal modulated wave signal having been selected and amplified in the unit 10 is applied to the sound-signal reproducing apparatus 29. Therein it is further amplified and detected to derive the sound-signal modulation components which may receive further amplification and be utilized to reproduce sound in the sound-reproducing device in the unit 29.

*Description of matrixing apparatus of Fig. 1*

As mentioned above and as will be made clear hereinafter, the purpose of the matrixing apparatus 16 of Fig. 1 is to derive the desired modulation components R–Y, G–Y, and B–Y from the subcarrier wave signal applied thereto. More specifically, such apparatus is for developing other modulated subcarrier wave signals from one modulated subcarrier wave signal, that is, the signal translated through the amplifier 18 and which is modulated at different phase points by individual ones of a pair of components, specifically, I and Q components individually representative of different colors of a televised image. The other modulated subcarrier wave signals each have a modulation component composed of predetermined magnitudes of the pair of components I and Q. As will be explained more fully hereinafter, the I and Q components have different maximum band widths, specifically, the I component has a maximum band width of approximately 1.3 megacycles while the Q component has a maximum band width of approximately .6 megacycles. The Q components are translated as double side-band modulation components of the subcarrier wave signal and the I components are translated with those frequencies above .6 megacycle as single side-band components of the one subcarrier wave signal.

The matrixing apparatus includes first and second networks coupled for developing the aforesaid other wave signal. The first network is responsive to the aforesaid one wave signal and has a pass band which is approximately equal to the band width of the modulation components representative of the wider band components and which includes the mean frequency of the one subcarrier wave signal. Such first network includes a tuned circuit 41, one terminal of which is coupled through a condenser 40 and one of the pair of terminals 19, 19 to an ungrounded terminal of the amplifier 18, and includes another tuned circuit 43 inductively coupled to the circuit 41 with slightly greater than critical coupling. The tuned circuits 41 and 43 both include damping resistors to broaden the pass bands thereof so that they effectively translate signals in substantially the band 2.3–4.2 megacycles and thus translate a modulated 3.6 megacycle subcarrier wave signal having an upper side band of approximately .6 megacycle and a lower side band of approximately 1.3 megacycles. Actually such network would have a pass band symmetrical about 3.6 megacycles and thus would be 2.3–4.9 megacycles. However, it is not essential that the pass band of the first network be as wide as just described. When such network is described as having a pass band approximately equal to the band width of the 1.3 megacycle I components, it is meant that the width of such band is within a range of twice to one-half the band width of the I components. The first network also has predetermined amplitude-translation and phase-translation characteristics for developing in such network a first signal modulated at a predetermined phase by the I components. Since the circuits 41 and 43 are coupled tuned circuits there is a quadrature phase shift of the signal developed in the circuit 43 with respect to that applied to the circuit 41, as will be described more fully hereinafter. Additionally, the signal-transfer impedance, such as represented by the ratio of the output voltage to the input current, of the circuits 41 and 43 is proportioned to develop a signal of predetermined intensity as will also be explained more fully hereinafter.

The second network of said matrixing apparatus, specifically, a tuned circuit 42 is responsive to the wave signal applied through the pair of terminals 19, 19 and has a pass band which is narrower than the pass band of the first network and which is approximately equal to the band width of the modulation components representative of the narrower band or Q components and which includes the mean frequency of the one wave signal. In the present embodiment the applied signal is considered as a current. The parallel-tuned circuit 42 includes a damping resistor proportioned to provide such circuit with a pass band of approximately 1.2 megacycles, specifically, the band from 3–4.2 megacycles for translating the 3.6 megacycle subcarrier wave signal and the double side-band Q modulation components thereof. Though the pass band just described is preferred, it is not essential that it be that wide. Therefore, when it is stated herein that such pass band has a width approximately equal to the band width of the Q modulation components, it is intended only that the pass band have a width in the range of twice to one-half the band width of the Q components. The amplitude-translating characteristic, in the present embodiment, the transfer impedance of the tuned circuit 42, is proportioned with respect to the transfer impedance of the tuned circuits 41 and 43 so that the signals developed in the circuits 42 and 43 have predetermined intensity relations. Additionally, the elements in the tuned circuit 42 are proportioned to effect little or no phase shift of the signal applied thereto, and thus the second network has a phase-translation characteristic different from that of the first network. As a result, the signal developed in the circuit 42 has each Q modulation component thereof at a phase point which is substantially in phase with the phase point of each of the I modulation components of the signals developed in the circuit 43.

The matrixing apparatus also includes means coupling the first and second networks for combining the first and second signals to develop the other wave signal previously mentioned herein. More specifically, such means comprises a conductor 45 coupled between the ungrounded terminal of the resonant circuit 42 and an intermediate terminal on the inductor in the tuned circuit 43.

The matrixing apparatus may also include apparatus for utilizing the subcarrier wave signals developed in the tuned circuit 43, more specifically, the signals developed at pairs of terminals 80, 80 and 81, 81 coupled to that winding and to ground. Such utilizing apparatus may include a pair of synchronous detectors 46, 47, individually coupled to different ones of the pairs of terminals 80, 80 and 81, 81, and three similar signal-combining amplifiers 48R, 48G, and 48B, the amplifiers 48R and 48B being individually coupled to the output circuits of the synchronous detectors 46 and 47, respectively, and also coupled through the pair of input terminals 20, 20 to the monochrome signal amplifier while the amplifier 48G is coupled to the cathodes of the tubes of the amplifiers 48R and 48B and to the pair of input terminals 20, 20. The output circuits of the amplifiers 48R, 48G, and 48B are coupled, respectively, through conventional direct-current restorers 49R, 49G, and 49B and the terminals 50R, 50G, and 50B, respectively, to different ones of the control electrodes in the picture tube of the image-reproducing device 17.

The synchronous detectors 46 and 47 are substantially identical and a description of one thereof will suffice for both. The detector 46 includes a pentode 51 having the first control electrode thereof coupled through a parasitic-suppression resistor 52 to the ungrounded one of terminals 80, 80 and the third control electrode thereof is coupled through an isolating resistor 53 to the ungrounded terminal of a tuned circuit 54 which is coupled across the pair of terminals 28, 28. The first control electrode of the pentode of detector 47 is connected to the ungrounded one of the terminals 81, 81 through a parasitic resistor 52′. The tuned circuit 54 is resonant at approximately the subcarrier wave-signal frequency, that is, approximately 3.6 megacycles and is also coupled through a coupling condenser 56 and the pair of terminals 26, 26 to an input circuit of the phase-control system 25. The second control electrode in the tube 51 is coupled through a resistor 57 to a source of potential +B and is coupled to ground through a by-pass condenser 39. The anode of the tube 51 is coupled in cascade through a parallel-tuned circuit 58, an inductor 59, a resistor 60, another inductor 61, a condenser 62, and a parasitic-suppression resistor 63 to the control electrode of a pentode 64 in the signal-combining amplifier 48R. The parallel-tuned circuit 58 is resonant at substantially 3.6 megacycles. The anode of the tube 51 is also coupled to ground through a condenser 65, and the junction of the inductor 59 and the resistor 60 is coupled to ground through a condenser 66. This junction additionally is coupled through a resistor 67 to the corresponding junction in the anode load circuit of the tube in the synchronous detector 47. The elements 58–60, inclusive, 65, and 66 comprise a low-pass filter network for translating signals having a maximum frequency of the order of 1.3 megacycles to the control electrode of the tube 64. The cathode of the tube 51 is coupled through a resistor 68 and the variable tap of a voltage divider 69 to ground. The voltage divider 69 is utilized to adjust the relative gains of the synchronous detectors 46 and 47. The synchronous detector 47, as explained previously, is similar to the detector 46 having the anode of the tube thereof coupled through an anode load circuit similar to that described with reference to the tube 51 to the control electrode of a tube in the signal-combining amplifier 48B corresponding to the tube 64 in the amplifier 48R.

Since the amplifiers 48R and 48B are substantially identical and the amplifier 48G only differs slightly therefrom, it will suffice to describe in detail the amplifier 48R and then point out the differences in the amplifier 48G. In the input circuit of the tube 64, the junction of the inductor 61 and the resistor 60 is coupled through a voltage-dropping resistor 70 to the ungrounded one of the pair of terminals 20, 20. The cathode of the tube 64 is coupled through a biasing resistor 71 to the junction of the condenser 62 and the resistor 63 in the control-electrode circuit of the tube 64, is further coupled to ground through a load resistor 72, and is coupled through a resistor 73 to the cathode of the tube in the amplifier 48G corresponding to the tube 64 in the amplifier 48R. The suppressor electrode of the tube 64 is grounded while the screen electrode thereof is coupled to a tap on a voltage divider comprising a pair of resistors 74 and 75 connected across a source of potential +B, this screen electrode also being coupled to ground through a by-pass condenser 76. The anode of the tube 64 is connected through a series circuit of a load resistor 77 and a tuned circuit 78 to a source of potential +B, the tuned circuit 78 being a peaking circuit for the higher video-frequency signals. This anode is also coupled through an inductor 79 to the direct-current restorer 49R and through a filter condenser 80' to ground. Except for the proportioning of the cathode load resistor in the signal-combining amplifier 48B, as will be discussed more fully hereinafter, the amplifier 48B is identical to the amplifier 48R. The amplifier 48G differs from the amplifier 48R in that the cathode circuit of the tube in the amplifier 48G includes the cathode circuits of the tubes in the amplifiers 48R and 48B, for reasons to be explained more fully hereinafter, and also in that the control electrode of the tube in the amplifier 48G is not connected to an output circuit of either of the synchronous detectors 46 or 47.

*Explanation of operation of matrixing apparatus 16 of Fig. 1*

Figure 2A:
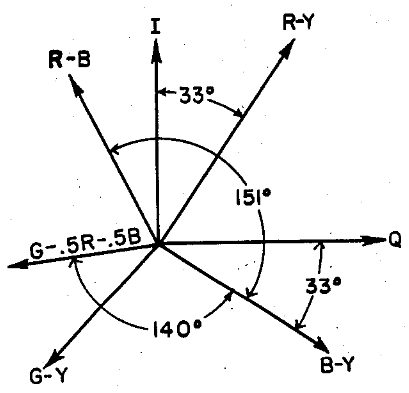

Prior to considering in detail the operation of the matrixing apparatus 16 of Fig. 1, it will be helpful to consider the relationships of the color-difference signals R–Y, B–Y, and G–Y and of the modulation components I and Q both in phase and magnitude as they appear as modulation components of the subcarrier wave signal developed in the output circuit of the amplifier 18. Fig. 2*a*, which represents a vector diagram of the phase relation of these components, will assist in such consideration. It is ultimately desired to obtain the color-difference components R–Y, B–Y, and G–Y. However, the components which are normally derived initially from the subcarrier wave signal and then matrixed to develop the R–Y, B–Y, and G–Y components are the components I and Q. The component I prior to being utilized to modulate the subcarrier wave signal at the transmitter has a band width of approximately 1.3 megacycles while the component Q has a band width of approximately .6 megacycle. The components I and Q are utilized for color transmission and derivation because the colors represented by Q are colors to which the eye has less acuity with respect to detail than are the colors represented by I. Therefore, the colors represented by Q are transmitted with relatively narrow band widths while those represented by I are transmitted with much wider band widths. To minimize cross talk, the modulated subcarrier wave is transmitted and received with the Q signal as double side-band modulation components thereof while the subcarrier wave signal only has double side-band modulation components representative of the low-frequency components of the I signal, that is, representative of the components thereof up to .6 megacycle. The components of the I signal between .6 and 1.3 megacycles are transmitted only as single side-band modulation components of the modulated subcarrier wave signal. The signals I and Q effect quadrature modulation of the subcarrier wave signal, appearing at quadrature phase points on each cycle of such subcarrier wave signal, in a manner similar to that described in the aforementioned "Electronics" article.

At the receiver, the operations of the synchronous detectors could be so controlled as to derive directly the R–Y, B–Y, and, if desired, G–Y components from the received subcarrier wave signal. However, such derivation would not be advantageous since the higher frequency I components as thus derived would tend not to faithfully represent the transmitted single sideband I components because of quadrature cross talk. Therefore, it is beneficial to derive the I and Q signals utilizing the double side-band transmission and band limitation of the Q signal to minimize the cross talk between the derived signals. However, it is desired, if possible, to obtain the advantages provided by the I and Q signals while directly deriving from the modulated subcarrier wave signal the R–Y, and B–Y, and, possibly, the G–Y components. The matrixing apparatus 16 of Fig. 1 facilitates such direct derivation of the R–Y and B–Y components while retaining the benefits provided by the double side-band transmission of the narrower band width Q signal and the single side-band transmission of the wider band width I signal in quadrature with the Q signal and minimizes the aforesaid cross talk.

As is evident from the vector diagram of Fig. 2*a*, an R–Y signal includes predetermined proportions of positive I and Q signals while a B–Y signal includes other predetermined proportions of positive Q and minus I signals. Similarly, the G–Y signal includes definite proportions of minus Q and minus I signals. These relationships may be expressed as follows:

$$R-Y=0.62Q+0.96I \quad (1)$$

$$B-Y=1.70Q-1.10I \quad (2)$$

$$G-Y=-0.65Q-0.28I \quad (3)$$

Therefore, if a subcarrier wave signal having an intensity of 0.96 with respect to any arbitrary scale and with the modulation component I at, for example, 0° phase with respect to an arbitrary phase reference, is combined with a band limited subcarrier wave signal having an intensity of 0.62 and with the Q component of such wave signal at 0° phase with respect to the same reference phase, then it is apparent that the combination of the two wave signals with such phase relations of the I and Q signals, that is, with the signals in phase with each other and with the intensities just mentioned will develop a subcarrier wave signal effectively modulated at such phase point, that is, at 0° phase, with an R–Y component. It is to be understood that in such combination of the subcarrier wave signal, the benefits of double side-band transmission of the narrower band width Q signal and of single side-band transmission of the wider band width I signal are retained and, thus, the R–Y signal on the resultant subcarrier wave signal has no more cross talk than would be in such signal if the I and Q components had first been derived and the Q component band limited and then the derived components combined to develop the R–Y signal. Similar relationships exist for the B–Y and G–Y color-difference signals developed by combinations of subcarrier wave signals having the I and Q components in phase and with proper relative intensities as defined by Equations 2 and 3 above, respectively. The matrixing apparatus of Fig. 1 develops such subcarrier wave signals of proper relative intensities modulated by the R–Y and B–Y components and with the I and Q components of the wave signals which are combined being in phase with each other.

Figure 2B:
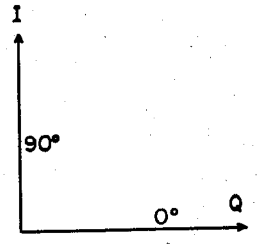

Referring now to Fig. 1, the subcarrier wave signal developed in the output circuit of the amplifier 18 is applied through the pair of terminals 19, 19 and the condenser 40 to the tuned circuits 41 and 42. The modulated subcarrier wave signal or second signal developed across the tuned circuit 42 may be considered to have the I and Q modulation components thereof in the relationship represented by the vectors of Fig. 2*b*. As has been previously stated, the pass band of the tuned circuit 42 is such as to be approximately 3.0–4.2 megacycles centered on the 3.6 megacycle mean frequency of the subcarrier wave signal. Thus, the pass band of the tuned circuit 42 is such as to translate the double side band of the Q modulation component of the wave signal.

Figure 2C:
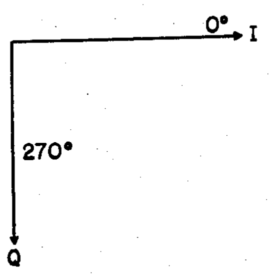

The signal developed in the tuned circuit 41 is coupled to the tuned circuit 43 and, because of such coupling, there is a 90° phase shift in such signal so that, with respect to the same phase reference, the signals developed in the tuned circuit 43 have the modulation components I and Q thereof in the relationship represented by the vector diagram of Fig. 2*c*. The network including the tuned circuits 41 and 43 is proportioned to have a pass band equal to that of the total band width for the I modulation component of the subcarrier wave signal, that is, approximately a pass band of 2.3–4.2 megacycles. This pass band is wide enough to translate a .6 megacycle double side-band modulation component of the 3.6 megacycle subcarrier wave signal and a .7 megacycle single side-band component in the frequency range 2.3–3 megacycles. Considering the vector diagrams of Figs. 2*b* and 2*c*, it is seen that the subcarrier wave signals having I and Q modulation components at 0° can be combined to develop a resultant subcarrier wave signal having the sum of the I and Q components as a modulation component at 0°. If the transfer impedances of the circuits 41, 43 and of the circuit 42 are properly proportioned, the vectors I and Q in Figs. 2*b* and 2*c* can be made to have the relative intensities .96 and .62. The subcarrier wave signal having a .62Q component and the subcarrier wave signal having a .96I component combine to develop a subcarrier wave signal which is effectively modulated at the 0° phase point by an R–Y component as defined by Equation 1. Actually, the portion of the tuned circuit 43 in which the impedance is proportioned to develop a subcarrier wave signal having the .96I component is that portion between the tapped point on the inductor in such circuit and the upper terminal 80 of such circuit. The impedance of the circuit 42 is proportioned to develop a subcarrier wave signal having the .62Q component. Consequently, the signal developed between the tapped point and the ungrounded terminal 80 is combined with the signal developed in the tuned circuit 42 to develop at the terminals 80, 80 a signal modulated at the 0° phase point by an R–Y color-difference signal including all of the beneficial characteristics of the I and Q signals.

Similarly, to develop the B–Y component there should be combined a minus I signal and a plus Q signal. Therefore, the transfer impedance between the input circuit of circuit 41 and the output circuit including the tap point in the tuned circuit 43 and the ungrounded one of the terminals 81, 81 is proportioned with respect to the impedance of the single tuned circuit 42 to combine the proper proportions of minus I and plus Q signals as defined in Equation 2 above to develop another wave signal at the pair of terminals 81, 81 modulated at the 0° phase point by a B–Y color-difference signal including all of the beneficial characteristics of the I and Q signals. The details of such proportioning and the values of circuit elements for a specific embodiment of the invention will now be considered.

In view of the relationships expressed for R–Y and B–Y by Equations 1 and 2 above, an initial approach in proportioning the transfer impedances of the tuned circuits 41, 43 and of the circuit 42 would be to consider the total transfer impedance of the tuned circuits 41 and 43 as equal to .96+1.10 or approximately 2.06 with respect to any arbitrary impedance scale. It is seen that the terms .96 and 1.10 are the coefficients of I in Equations 1 and 2. By so proportioning the transfer impedance of the circuits 41 and 43, the tap point in the circuit 43 can be such as to give relative transfer impedances of .96 for the upper portion and 1.10 for the lower portion of the circuit 43. However, the Q signal developed across the tuned circuit 42 has only one intensity whereas, in order to combine with the I signals to develop R–Y and B–Y signals as defined by Equations 1 and 2, the Q signal should have an intensity of 0.62 for R–Y and of 1.70 for B–Y. Thus, if with respect to the same arbitrary impedance scale the transfer impedance of the tuned circuit 42 is proportioned to be .62, then the gain of the system for translating the subcarrier modulated by the B–Y signal should be proportioned so that .62Q multiplied by such gain equals 1.70Q. In order to permit such relative gain in the channel for translating the B–Y signal, the intensity of the I component to be combined with the Q component for developing the subcarrier wave signal modulated by B–Y has to be initially reduced by the amount of such gain so that the combination of the I and Q components for the subcarrier wave signal modulated by B–Y multiplied by the gain for the B–Y signal will give the relationship expressed by Equation 2, that is, an effective combination of 1.70Q and 1.10I. Therefore, to proportion the transfer impedances of the circuits 41, 43 and of the circuit 42, it may initially be assumed that the transfer impedance of the circuit 42 with respect to an arbitrary impedance scale is .62. With respect to the same scale, the transfer impedance of the tuned circuits 41 and 43 should be $.96+1.10/\mu$ where $\mu$ represents the relative gain of the channels for translating the signal representative of B–Y with respect to that for translating the signal representative of R–Y and is equal to 1.70/.62. The tap point on the inductor of the circuit 43 is such as to give an effective transfer impedance of .96 between the tap and the upper terminal of the circuit 43 and an effective impedance of $1.10/\mu$ between the tap and the lower terminal of such circuit. In the matrixing apparatus of Fig. 1, the synchronous detector 47 is proportioned to have a gain $\mu$ with respect to the synchronous detector 46 by adjusting the resistor 69.

The subcarrier wave signal developed between the terminals 80, 80 in the output circuit of the tuned circuit 43 and modulated by the R–Y component is applied to the control electrode of the tube in the synchronous detector 46 while the subcarrier wave signal developed at the terminals 81, 81 and modulated by the B–Y component is applied to the conrol electrode of the corresponding tube in the synchronous detector 47. The R–Y modulation component on the subcarrier wave signal applied to the detector 46 is at the same phase as the B–Y component on the subcarrier wave signal applied to the detector 47 and, thus, the 3.6 megacycle signal developed in the tuned circuit 54 may be properly phased to derive the R–Y components in the detector 46 and the B–Y components in the detector 47 by heterodyning of the reference signal and the modulated subcarrier wave signals in these detectors. The R–Y component is reduced in frequency to a signal having a maximum frequency of approximately 1.3 megacycles by the anode load circuit of the tube 51 and is applied to the control electrode of the tube 64 in the signal-combining amplifier 48R. Similarly, the B–Y component is limited to frequencies below approximately 1.3 megacycles and applied to the control electrode of the corresponding tube in the signal-combining amplifier 48B. The resistor 67 coupled to the control electrode of tube 64 effects some coupling of the B–Y component into the channel for translating the R–Y component and similarly some coupling of the R–Y component into the channel for translating the B–Y component. Effectively such coupling pulls the R–Y and B–Y vectors as represented in Fig. 2*a* closer together to compensate for actions in the signal-combining amplifiers 48R and 48B which tend to spread such vectors apart. In other words, the B–Y component coupled into the channel for translating the R–Y component effects cancellation of a B–Y component that tends to be coupled into such channel during the signal-combining operation occurring in the amplifiers 48R, 48G, and 48B.

The color-difference signal G–Y includes predetermined proportions of the signals R–Y and B–Y and is defined as follows:

$$G-Y=-.51(R-Y)-.19(B-Y) \qquad (4)$$

The cathode load resistor 72 of the tube 64 in the amplifier 48R and the resistor 73 therein are proportioned to develop an R–Y component equal in intensity, with respect to unity scale for the brightness signal, to the coefficient of R–Y in Equation 4. Similarly, the corresponding resistors in the amplifier 48B develop a B–Y component having an intensity as represented by the coefficient of the B–Y component in Equation 4. These two components are applied to the cathode of the tube in the amplifier 48G and comprise a G–Y signal.

It should be noted that these cathode circuits effect the aforementioned cross coupling of the R–Y and B–Y signals which tend to spread apart the vectors in Fig. 2*a* representing such signals. The Y or brightness signal applied to the unit 16 through the pair of terminals 20, 20 is applied with proper relative intensities to each of the signal-combining amplifiers 48R, 48G, and 48B to develop in the output circuits of such amplifiers the signals R, G, and B, respectively. The direct-current restorers 49R, 49G, and 49B act in a conventional manner to establish the proper brightness level for the signals R, G, and B, respectively, and these signals are individually applied to different ones of the control electrodes in the image-reproducing device 17 to effect reproduction of the televised color image in the manner previously described herein.

The matrixing apparatus just considered includes many beneficial features. The tuned circuits 41, 43 may be proportioned to translate the full side bands of the NTSC subcarrier wave signal including the wider band width I modulation component while the circuit 42 may be proportioned to translate only components having that band width of the NTSC subcarrier wave signal which includes the double side bands of the narrower band with Q modulation component. The units 41 and 43 are effective to provide the desired phase shifting of the signal translated therethrough so that the subcarrier wave signal developed across the circuit 43 has the I component thereof in phase with the Q component of the subcarrier wave signal developed across the circuit 42. The combination of the wide band and coupled pair of tuned circuits 41 and 43 tends to cause the signals translated through these circuits to have the same time delay as that of the narrower band signal translated through the single circuit 42. The subcarrier wave signals developed in the output circuit of the tuned circuit 43 and, particularly, on the pairs of terminals 80, 80 and 81, 81 have the R–Y and B–Y modulation components at the same phase with respect to the reference signal developed in the tuned circuit 54. Thus, no phase shifting of such reference signal is required to derive both the R–Y and B–Y modulation components.

While applicant does not wish to be limited to any particular circuit values for the embodiment of the invention described above, the following is a set of values which may be utilized in the matrixing apparatus of Fig. 1.

| | |
|---|---|
| Resistors of circuits **41** and **43** | 7500 ohms. |
| Resistor of circuit **42** | 1600 ohms. |
| Resistors **52** and **52'** | 330 ohms. |
| Resistor **53** | 100 ohms. |
| Resistor **57** | 22 kilohms. |
| Resistor **60** | 12 kilohms. |
| Resistor **63** | 100 ohms. |
| Resistor **67** | 200 kilohms. |
| Resistor **68** | 220 ohms. |
| Resistor **69** | 250 ohms. |
| Resistor **70** | 2700 ohms. |
| Resistor **71** | 1 megohm. |
| Resistor **72** | 330 ohms. |
| Resistor **73** | 68 ohms. |
| Resistor **74** | 3500 ohms. |
| Resistor **75** | 5000 ohms. |
| Resistor **77** | 4100 ohms. |
| Condensers **39** and **76** | 8 microfarads. |
| Condenser **40** | 1000 micromicrofarads. |
| Condensers of circuits **41, 42,** and **43** | Sufficient to resonate inductors of those circuits to 3.6 megacycles. |
| Condenser of circuit **58** | 1–3 micromicrofarads. |
| Condenser **62** | .47 microfarad. |
| Condenser **65** | 5–20 micromicrofarads. |
| Condenser **66** | 3–12 micromicrofarads. |
| Condenser of circuit **78** | 10 micromicrofarads. |
| Condenser **80'** | 5–20 micromicrofarads. |
| Inductors of circuits **41** and **43**. | 97 microhenries. |
| Inductor of circuit **42** | 21 microhenries. |
| Inductor of circuit **58** | 700 microhenries. |
| Inductor **59** | 3.6 millihenries. |
| Inductor **61** | 110 microhenries. |
| Inductor of circuit **78** | 90 microhenries. |
| Inductor **79** | 300 microhenries. |
| Tube **51** | Type 6AS6. |
| Tube **64** | Type 6AH6. |
| Potential +B | 215 volts. |

Figure 3:
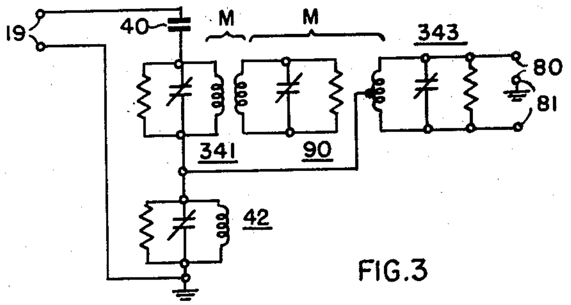
Fig. 3 is a circuit diagram of a modified form of a portion of the apparatus of Fig. 1.

*Description of explanation of operation of portion of matrixing apparatus represtned by Fig. 3*

The delay in translation of a signal through a pair of coupled tuned circuits having a pass band greater than twice the width of the pass band of the single tuned circuit may not be exactly equal to the delay of a signal translated through such single tuned circuit. It may be desired to increase the delay in such wider band circuit. The apparatus of Fig. 3 is designed to effect such increased delay. Since the apparatus of Fig. 3 is similar to the apparatus of Fig. 1, similar circuit tlements are identified by the same reference numerals. Analogous elements are identified in the apparatus of Fig. 3 by the reference number of the analogous elements in Fig. 1 with a factor of 300 added thereto.

The apparatus of Fig. 3 includes an additional tuned circuit 90 coupled between the tuned circuits 341 and 343 to effect the increased delay desired. Since the addition of tht tuned circuit 90 would cause the signal developed in the tuned circuit 343 normally to be shifted to 0° or 180° as translated from the input terminals of circuit 341 to the output terminals of circuit 343 depending on the coupling if the circuits 341, 90, and 343 were tuned to the frequency of the subcarrier wave signal, these circuits are tuned to a lower frequency, for example, a frequency of approximately 3.2 megacycles to effect only a 90° phase shift at 3.6 megacycles between the signal in the tuned circuit 341 and that developed in the tuned circuit 343 if the pass band for such circuits is 2.0–4.4 megacycles. Except for the increase in the band width of the signal through the circuits 341, 90, and 343, the apparatus of Fig. 3 operates in a manner similar to that explained with reference to the apparatus 16 of Fig. 1.

Figure 4:
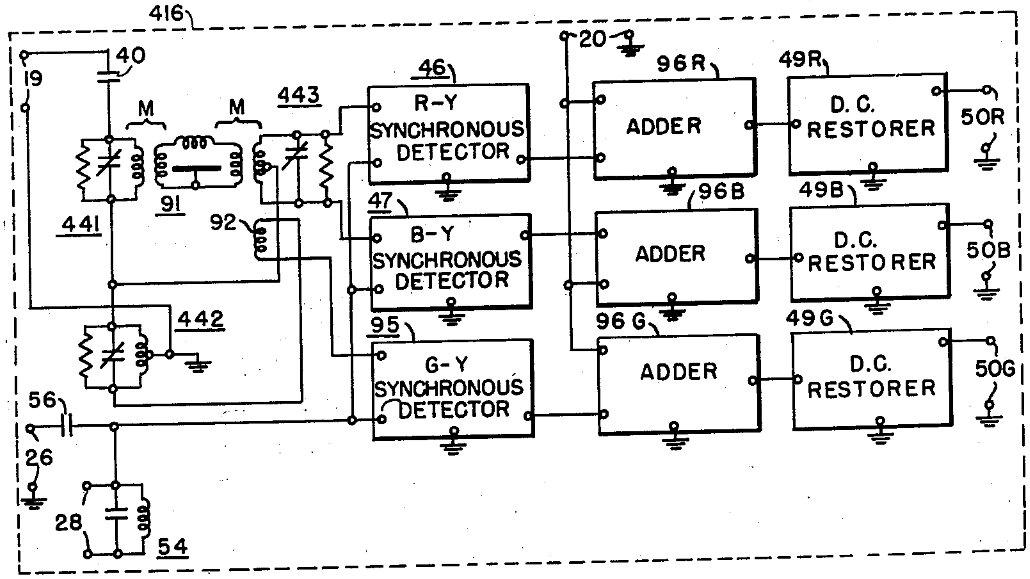
Fig. 4 is a diagram of another modified form of the apparatus of Fig. 1.

*Description and explanation of operation of the matrixing apparatus of Fig. 4*

The apparatus described with reference to Figs. 1 and 3 develops subcarrier wave signals modulated by the R–Y and B–Y color-difference components and then utilizes derived ones of such color difference components to develop the G–Y color-difference component. It may be desired to develop subcarrier wave signals including not only the above-mentioned color-difference components but also the G–Y component. The apparatus of Fig. 4 develops three subcarrier wave signals individually modulated by such three color-difference components. Since the apparatus of Fig. 4 is similar to the apparatus of Fig. 1 similar circuit elements are identified by the same reference numerals. Analogous elements and units are identified in the apparatus of Fig. 4 by the reference number of the analogous element or unit in Fig. 1 with a factor of 400 added thereto.

In the apparatus of Fig. 4, in the tuned circuit 442 a tap point on the inductor in such circuit is connected to ground and the impedances between such tap point and the upper terminal of the tuned circuit and between the tap point and the lower terminal of the tuned circuit are proportioned to develop subcarrier wave signals modulated by +Q and −Q signals, respectively, for reasons to be described more fully hereinafter. The tuned circuits 441 and 443 are coupled by a conventional delay line 91 to effect any increased delay needed to make the time of travel of the signals through the wider band width circuits 441, 91, and 443 equal to that through the narrower band width circuit 442. In addition, a winding 92 is tightly coupled to the tuned circuit 443 to develop a modulated subcarrier wave signal modulated by the G–Y component in a manner to be explained more fully hereinafter. Finally, in addiiton to the synchronous detectors 46 and 47, there is a third synchronous detector 95 for deriving the G–Y component. The R–Y, B–Y, and G–Y components are then individually combined with a Y component in the adder circuits 96R, 96B, and 96G and the outputs of such adder circuits are individually coupled to the direct-current restorers 49R, 49G, and 49B.

The apparatus of Fig. 4 operates in a manner similar to that of the apparatus of Fig. 1 to develop the R–Y and B–Y color-difference signals. The delay line 91 provides any additional delay required in the channel for translating the subcarrier wave signal modulated by the I component. It may also cause a phase shift permitting, as in the Fig. 3 circuit, the center frequency of the pass band to be below that of the subcarrier wave signal. To develop the subcarrier wave signal modulated by the G–Y component, the impedance of the tuned circuit 442 is increased by that portion between the grounded tap point and the lower terminal of such tuned circuit. Such lower portion of the circuit 442 effectively has an impedance of .65 and the transfer impedance from the circuit 441 through the inductor 92 is proportioned to have a value of .28. The signals developed in the lower portion of the tuned circuit 442 are 180° out of phase with the signals developed in the upper portion there. Similarly, the signals developed in the inductor 92 are 180° out of phase with the signals in the upper portion of the tuned circuit 443. Thus, the signals in the lower portion of the circuit 442 and in the inductor 92 are subcarrier wave signals modulated by —Q and —I signals, respectively, and because of the relative impedances of the circuits in which they are developed have intensities of such order as to combine in the manner defined by Equation 3 above to develop a subcarrier wave signal modulated by the G–Y component at the 0° phase point. The synchronous detector 95 for deriving the G–Y component operates in the same manner as the detectors 46 and 47 discussed with reference to Fig. 1 and the reference signal applied from the tuned circuit 54 is not modified in phase for application to the synchronous detector 95. The adder circuits are of conventional type and may comprise a simple network of resistors for combining the color-difference signals and the Y signal to develop the R, G and B signals.

Figure 5:
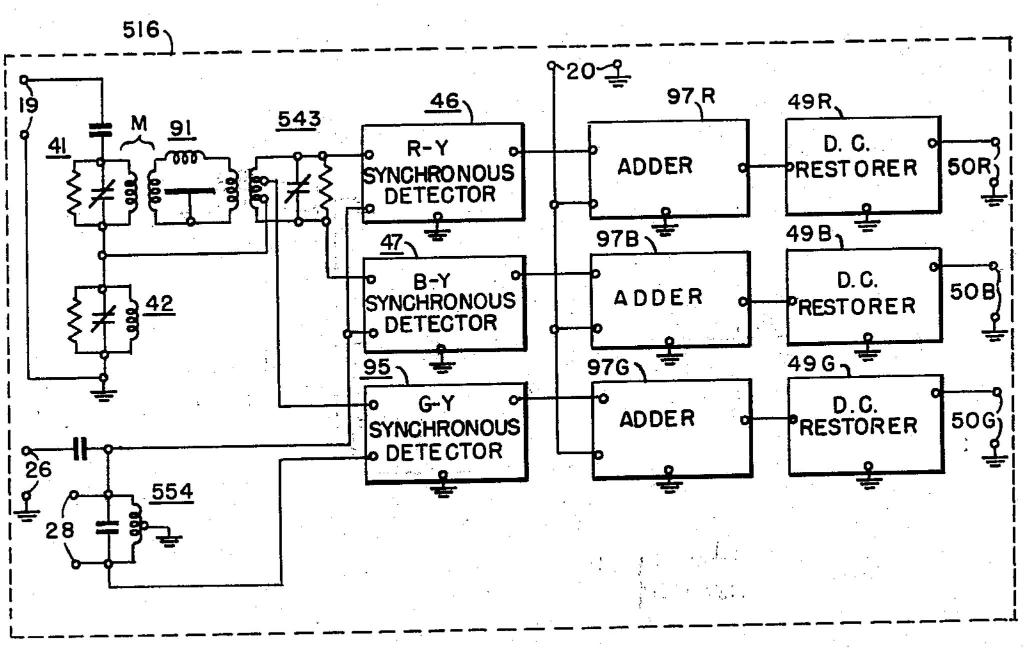
Fig. 5 is a schematic diagram of a modified form of a part of the apparatus of Fig. 4.

*Description and explanation of matrixing apparatus of Fig. 5*

Fig. 5 represents another matrixing apparatus for developing subcarrier wave signals modulated by R–Y, B–Y, and G–Y color-difference signals. Since the apparatus of Fig. 5 is similar to the apparatus of Figs. 1 and 4, units which are the same in these apparatus are designated by the same reference numerals. Units in the apparatus of Fig. 5 which are analogous to units in that of Fig. 1 are designated by the reference numerals of such units in Fig. 1 with the addition of 500 thereto.

The apparatus of Fig. 5 differs from that of Fig. 4 by including the tuned circuit 42 of Fig. 1 instead of the corresponding circuit 442 of Fig. 4 and by including a modified tuned circuit 543 which has not only the tap previously described herein but also an additional tap between the previously mentioned tap and the upper terminal of the circuit 543. Finally, the inductor in the tuned circuit 554 is connected to ground through a center tap and the upper terminal of such circuit is coupled to the synchronous detectors 46 and 47, as previously described with reference to Figs. 1 and 4, and the lower terminal is connected to the synchronous detector 95 so as to apply a signal of one phase to the units 46 and 47 and of opposite phase to the unit 95.

Except for the operations of the circuits 42, 543, and 544, the apparatus of Fig. 5 operates in a manner similar to that of Fig. 4. The extra tap in the circuit 543 is positioned, in the manner previously described herein with respect to the other tap on such circuit, so that at such point the subcarrier wave signal having a Q component at the predetermined phase developed in the circuit 42 combines with a subcarrier wave signal having an I component at the same phase in the proportions defined by Equation 3 above. However, the Q and I components are positive instead of negative as defined by the latter Equation and, thus, a subcarrier wave signal having a —(G–Y) modulation component at the predetermined phase is developed. To obtain the G–Y color-difference signal the reference signal applied to the detector 95 by the circuit 554 is modified to be 180° out of phase with the predetermined phase and thus a +(G–Y) signal is derived from the subcarrier wave signal applied by the tuned circuit 543 to the detector 95.

Though the matrixing apparatus considered herein has been described with reference to a system wherein it is desired to derive R–Y, B–Y, and possibly G–Y signals from the modulated subcarrier wave signal while retaining the benefits obtainable when I and Q signals are derived and matrixed, it should be understood that the invention is not limited to utilization with such first-mentioned signals. For example, there is described in a copending application, Serial No. 384,237, filed October 5, 1953, entitled "Image-Reproducing System for a Color-Television Receiver," now Pat. No. 2,734,940 granted February 14, 1956, an image-reproducing system which utilizes signals on the R–B and G–.5B–.5R axes as represented in Fig. 2*a*. The apparatus 16 of Fig. 1 will develop subcarrier wave signals having the last-mentioned axes in phase at the pairs of terminals 81, 81 and 80, 80, respectively, solely by proper proportioning of the transfer impedances of the circuits 41, 43 and of the circuit 42 so that the proper proportions of the I and Q components combine to develop, for example, at the pair of terminals 81, 81 a resultant subcarrier wave signal modulated at a predetermined phase with respect to a reference phase by the R–B component and to develop at the pair of terminals 80, 80 another subcarrier wave signal modulated by the component G–.5B–.5R at the same phase with respect to the reference phase. The proportions of the subcarrier wave signals individually modulated by I and Q components at the same phase which are required to develop other wave signals individually modulated by R–B and G–.5R–.5B at the same phase are defined by the following equations:

$$-(R\text{–}B)=1.1Q-2.1I \qquad (5)$$

and $$-(G\text{–}.5R\text{–}.5B)=1.8Q+.22I \qquad (6)$$

Thus, by proper proportioning of the transfer impedances of the circuits 41 and 43 and of the transfer impedance of the circuit 42 of Fig. 1 with respect to each other and by proper positioning of the tapped connection in the circuit 43, a subcarrier wave signal modulated by the component –(R–B) will be developed at the pair of terminals 81, 81 and, similarly, another subcarrier wave signal modulated by the component –(G–.5R–.5B), both such components being in phase, will be developed at the pair of terminals 80, 80. Having developed the latter subcarrier wave signals they may be utilized to reproduce color images in the manner more fully described in the aforesaid copending application with such relative gains in the channels for translating such subcarrier wave signals as may be required to provide the desired relative intensities for such wave signals as defined in the copending application.

There has been described herein a matrixing apparatus which utilizes the wide-band and narrow-band characteristics of the I and Q modulation components of the conventional NTSC subcarrier wave signal without requiring these modulation components to be derived. The benefits of such wide banding and narrow banding are obtained by developing pairs of subcarrier wave signals having the I component on one wave signal in phase with the band-limited Q component on another wave signal and of such relative intensities as to permit combining such wave signals with proper relative proportions of I and Q as defined by Equations 1–3, inclusive, above to develop subcarrier wave signals which are modulated by the color-difference signals R–Y, G–Y, and B–Y or, alternately, as defined by Equations 5 and 6 modulated by the signals R–B and G–.5R–.5B at the same phase point with respect to the phase of the reference signal developed for effecting derivation of such modulation signals.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver, a matrixing apparatus responsive to a supplied modulated subcarrier wave signal for developing another modulated subcarrier wave signal having a desired modulation component at a predetermined phase comprising: circuit means for supplying a subcarrier wave signal having wide-band and narrow-band modulation components, both comprising double-side-band modulation within a narrow band and said wide-band component comprising single-side-band modulation within the remainder of its band; a first network responsive to said supplied signal and having a wide pass band for developing a subcarrier wave signal modulated by said wide-band component; a second network responsive to said supplied signal and having a narrow pass band for developing a subcarrier wave signal modulated by said narrow-band component; and means intercoupling said networks for combining proportions of said developed subcarrier signals having said wide-band component at a predetermined phase and a modulation component representative of said narrow-band component at said predetermined phase to derive a subcarrier wave signal having a desired modulation component at said predetemined phase.

2. In a color-signal translating system for translating one subcarrier wave signal modulated at individual phase points by individual ones of I and Q components which are individually representative of different colors of a televised image and which have different maximum band widths the higher frequency portion of the wider band I component being translated with only a single side band, a matrixing apparatus for developing from said one wave signal another modulated subcarrier wave signal having another modulation component composed of predetermined magnitudes of said I and Q components comprising: a first network responsive to said one wave signal and having a pass band which is approximately equal to the band width of the modulation components representative of said I component and which includes the mean frequency of said one wave signal and said network having a desired transfer impedance and a phase-translation characteristic for developing in said network a first wave signal modulated at a predetermined phase by said I component; a second network responsive to said one wave signal and having a band width which is narrower than said first-mentioned pass band and approximately equal to the band width of the modulation components representative of said Q component and which includes the mean frequency of said one wave signal, said second network having a transfer impedance proportioned with relation to that of said first network and having a phase-translation characteristic different from that of said first network for developing in said second network a second wave signal having an intensity different from that of said first wave signal and modulated by said Q component at a phase point corresponding substantially to that of said predetermined phase; and means coupling said first and second networks for combining proportions of said first and second wave signals to develop said other wave signal having said other modulation component at said predetermined phase.

3. In a color-signal translating system for translating one subcarrier wave signal modulated at individual phase points by individual ones of a pair of components which are individually representative of different colors of a televised image and which have different maximum band widths the higher frequency portion of the wider band components of said pair being translated with only a single side band, a matrixing apparatus for developing from said one wave signal another modulated subcarrier wave signal having another modulation component composed of predetermined magnitudes of said pair comprising: a first network including a pair of tuned circuits and a delay line coupling said tuned circuits responsive to said one wave signal, said network having a pass band which is approximately equal to the band width of the modulation components representative of said wider band components and at least one of said tuned circuits being resonant at the mean frequency of said one wave signal and said network having a desired translation time for signals translated therethrough and having a desired transfer impedance and a phase-translation characteristic for developing in one of said tuned circuits a first wave signal modulated at a predetermined phase by said wider band components; a second network responsive to said one wave signal and having a pass band which is narrower than said first-mentioned pass band and approximately equal to the band width of the modulation components representative of the narrower band components and which includes the mean frequency of said one wave signal, said second network having a transfer impedance proportioned with relation to that of said first network having a translation time for signals translated therethrough substantially equal to that of said first network and having a phase-translation characteristic different from that of said first network for developing in said second network a second wave signal having an intensity different from that of said first wave signal and modulated by the narrower band components at a phase point corresponding substantially to that of said predetermined phase; and means coupling said first and second networks for combining proportions of said first and second wave signals to develop said other wave signal having said other modulation component at said predetermined phase.

4. In a color-signal translating system for translating one subcarrier wave signal modulated at individual phase points by individual ones of a pair of components which are individually representative of different colors of a televised image and which have different maximum band widths the higher frequency portion of the wider band components of said pair being translated with only a single side band, a matrixing apparatus for developing from said one wave signal a plurality of other modulated subcarrier wave signals having different modulation components each composed of predetermined magnitudes of said pair comprising: a first network including a pair of coupled tuned circuits and a third circuit tightly coupled to one of said tuned circuits, said network being responsive to said one wave signal and having a pass band which is approximately equal to the band width of the modulation components representative of said wider band components and at least one of said tuned circuits being resonant at the mean frequency of said one wave signal and said network having a desired transfer impedance and a phase-translation characteristic for developing in said network a plurality of first wave signals each modulated at a predetermined phase by said wider band components; a second network including another tuned circuit having a pair of terminals and an intermediate terminal responsive to said one wave signal and having a pass band which is narrower than said first-mentioned pass band and approximately equal to the band width of the modulation components representative of the narrower band components and resonant at the mean frequency of said one wave signal, said other tuned circuit having a transfer impedance proportioned with relation to that of said first network and having a phase-translation characteristic different from that of said first network for developing in said other tuned circuit a pair of wave signals at said pair of terminals with respect to said intermediate terminal and each having an intensity different from that of said first signal and each modulated by the narrower band components at a phase point corresponding substantially to that of said predetermined phase; and means coupling said other tuned circuit to one of said pair of tuned circuits and to said third circuit for combining predetermined ones of said plurality of first wave signals and of said pair of second wave signals to develop said plurality of other wave signals having said different modulation components at said predetermined phase.

References Cited in the file of this patent

UNITED STATES PATENTS

| | | |
|---|---|---|
| 2,725,422 | Stark | Nov. 29, 1955 |
| 2,732,425 | Pritchard | Jan. 24, 1956 |
| 2,766,321 | Parker | Oct. 9, 1956 |

OTHER REFERENCES

Compatible Color TV Receiver, pages 98–104, Electronics, January 1953.